3,819,786
PRODUCTION OF SILICON NITRIDE
MATERIAL COMPONENTS
Edwin Richard Wells May, Poole, England, assignor to National Research Development Corporation, London, England
No Drawing. Continuation of abandoned application Ser. No. 862,024, Sept. 29, 1969. This application Mar. 6, 1972, Ser. No. 232,220
Int. Cl. C04b 35/58
U.S. Cl. 264—63
3 Claims

ABSTRACT OF THE DISCLOSURE

Silicon nitride components are formed by hot milling and then shaping a dough-like material comprising silicon powder and a suitable organic chemical binder consisting of from 35 to 40% butyl methacrylate and 60–65% trichloroethylene and subsequently subjecting the form to a nitriding treament.

---

This is a continuation of application Ser. No. 862,024, filed Sept. 29, 1969, now abandoned.

The present invention relates to the manufacture of reaction-bonded silicon nitride bodies.

According to the invention silicon powder is mixed with a suitable organic chemical binder so as to form a dough-like material which can be worked and formed to shape. Thus the materail may, for instance, be moulded, rolled, bent or joined, either cold or hot as appropriate to the binder, to form in an extremely wide variety of shapes and sizes. The forms of compacted silicon powder may then be converted to a state suitable for reaction bonding by heating in nitrogen at nitriding temperatures.

The binder should not contain metallic contaminants and it should be capable of being evaporated or decomposed during subsequent treament of the material so as to leave the final nitride body substantially free from impurities arising from use of the binder. This is not to say, however, that a certain amount of residual carbon may not be beneficial.

According to one embodiment of the invention sheets of compacted silicon powder varying from 0.005" to $\frac{3}{16}$" thickness, may be prepared in this way and these can be made flexible so that they can be used for moulding into shaped components. Such sheets can be used also possibly in the form of strips for wrapping over moulds to build up a desired shape.

Specimens made to illustrate the fabrication of silicon nitride components by the use of the invention include: corrugated strips for heat exchanger matrices, tubes rolled up from sheet, dome shaped mouldings and spiral wound strips.

The technique can be employed to produce solid silicon nitride bodies, without the need for high pressure or isostatic pressing, with densities better than 2.2 gm./cm.$^3$. A cross breaking strength of just over 17,000 p.s.i. was obtaied from a bar 0.2" x 0.2" x 2".

Joints may be effected between strips by squeezing together the component parts or by the application of further silicon powder, with or without a suitable binder, depending on the strength of the bond required. Joints between component parts in accordance with the invention may be effected by applying a very small amount of trichloroethylene or acetone to the respective faces. Light pressure is preferably applied until the solvents have evaporated. The material may also be used for joining partially-nitrided silicon powder blocks and those produced by the flame-spraying of silicon powder.

The dough-like silicon powder material may be extruded or injection moulded to form shaped pieces. Densities (nitrided) of pieces of up to 2.4 g./cc. have been prepared in this way.

Reinforcement of components may be attained by the use of a sandwich type construction in which alternate layers of silicon bearing sheet and reinforcing medium are used. Sheet so formed is then shaped and nitrided.

Stages in the production of certain silicon nitride components utilising the present invention are described below by way of example:

PRODUCTION OF FLEXIBLE SHEET

Materials required:
Silicon powder able to pass 400 mesh iseve B.S. with purity as required.
Binder:
35% to 40% butyl methacrylate
60% to 65% trichloroethylene.

The silicon powder and binder are mixed together in the ratio 65% powder to 35% binder to the consistency of a stiff dough, spread on trays to a depth of approx. ¼ inch, and allowed to stand at room temperature until about 20% (by weight) of the trichloroethylene present in the binder has evaporated.

Semi-dried cake produced by the above process is then repeatedly hot milled in a roller type mill, roll temperature 45–50° C., until a consolidated sheet of the required thickness is obtained. Sheet so produced is very flexible when warmed to 50° C., it being fairly stiff when cold.

FORMATION OF COMPONENTS

The flexible sheet is cut into strips or other suitable shapes and formed into components using form tools heated to 45–50° C. One example is the use of toothed rolls to produce corrugated strips, and the use of dies or formers to produce shapes which may be domed, or box-like.

Spirals, and similar shapes are easily hand made by wrapping strips of the flexible sheet around warmed formers. Tubes may be made from rectangular sheets, the seam joint being effected by rolling until the bond line is eliminated.

PRE-NITRIDING TREATMENT

Components made as generally described in the previous section are then thoroughly freed from remaining solvent. One suitable method is to place formed components in a suitable vessel and heat under reduced pressure. The time required for this treatment depends upon the cross sectional area of components and experiments have shown that process times range from 2 hours at 130° C. for components with a thickness of 0.02" to 40 hours at 130° C. for components with a thickness of 0.2".

Large, delicate articles may require support to prevent collapse during the early stages of the process.

Too rapid a rate of temperature rise in the apparatus encourages the formation of blisters on the surface of components and a satisfactory schedule for the pre-nitriding process is:

Temperature rise 15° C. per hour from room temperature to 130° C.
Pressure in the vessel maintained at 20" Hg.

After the pre-nitriding treatment components are hard, dry, easily handled without damage, and will not distort during subsequent nitriding.

NITRIDING PROCESS

Stage I.—Removal of binder prior to nitridation: Furnace temperature is raised to 1000° C. at 50° C. per hour. A continuous flow of nitrogen is maintained throughout this period to ensure that decomposition products are removed from the furnace.

Stage II.—Nitridation: A static pressure of nitrogen of 1 p.s.i. is maintained in the furnace during the nitriding process. Nitriding times are governed by the cross sectional area of components to be nitrided. A typical schedule is:

| | |
|---|---|
| Thickness of component _____ in__ | 0.2 |
| Time at 1350° C. _____ hours__ | 20 |
| Time at 1450° C. _____ do__ | 10 |

Some properties of silicon nitride made in accordance with the invention have been measured and found to be:

| | |
|---|---|
| Specimen dimensions _____ | 0.2″ x 0.2″ x 2″. |
| Bulk density (green) _____ | 1.25 gm./cc. |
| Bulk density (nitrided) ____ | 2.24 gm./cc. |
| Cross breaking strength at room temperature _____ | 17,500 p.s.i. (3 point loading). |

What is claimed is:

1. A method of making silicon nitride articles comprising the steps of:
   (a) mixing silicon powder with a heat-removable organic binder consisting of from 35 to 40% butyl methacrylate and 60 to 65% trichloroethylene and thereby forming a mixture of silicon powder and binder having a ratio of 65% powder to 35% binder;
   (b) evaporating at least a proportion of the trichloroethylene from the mixture of step (a), thereby producing a semi-dried cake of dough-like consistency;
   (c) consolidating said semi-dried cake by repeated hot-milling thereof;
   (d) forming the consolidated mixture into the desired shape;
   (e) removing the remaining trichloroethylene from the formed article by heating it to about 130° C. for a time sufficient to remove the remaining trichloroethylene;
   (f) further heating the article to a temperature of about 1000° C. in a nitrogen atmosphere to remove the butyl methacrylate binder;
   (g) maintaining the article at a temperature of from about 1000° C. to about 1450° C. in an atmosphere of nitrogen for a sufficient time to convert the article to an article of reaction-bonded silicon nitride.

2. The method as claimed in claim 1 wherein the proportion of trichloroethylene evaporated in step (b) consists of about 20% by weight.

3. The method as claimed in claim 1 wherein the semi-dried cake is consolidated by repeated hot milling in a roller type mill at a temperature of from 45 to 50° C.

References Cited

UNITED STATES PATENTS

| | | | |
|---|---|---|---|
| 3,320,044 | 5/1967 | Cole et al. _____ | 264—63 |
| 2,929,126 | 3/1960 | Bollack et al. _____ | 264—63 |
| 3,324,074 | 6/1967 | McManimie _____ | 260—41 |

FOREIGN PATENTS

| | | | |
|---|---|---|---|
| 763,879 | 7/1967 | Canada _____ | 264—65 |
| 966,945 | 8/1964 | Great Britain _____ | 264—63 |
| 568,458 | 1/1959 | Canada _____ | 264—65 |
| 724,702 | 12/1965 | Canada _____ | 264—63 |

OTHER REFERENCES

J. J. Thompson: "Forming Thin Ceramics," September 1963, Ceramic Bulletin, pp. 480 and 481.

JEFFERY R. THURLOW, Primary Examiner

U.S. Cl. X.R.

106—55; 264—65, 82, 101, 175, 282; 423—353

UNITED STATES PATENT OFFICE
CERTIFICATE OF CORRECTION

Patent No. 3,819,786                Dated  June 25, 1974

Inventor(s)      Edwin Richard Wells May

It is certified that error appears in the above-identified patent and that said Letters Patent are hereby corrected as shown below:

Column 1, in the heading please insert the priority data as follows:  --Claims priority, application Great Britain 46625/68 filed October 1, 1968--

Column 1, line 28 correct spelling of "material"

Column 1, line 36, correct the spelling of "treatment"

Column 1, line 57, correct the spelling of "obtained"

Column 2, line 12, correct the spelling of "sieve"

Signed and sealed this 29th day of October 1974.

(SEAL)
Attest:

McCOY M. GIBSON JR.
Attesting Officer

C. MARSHALL DANN
Commissioner of Patents